United States Patent
Schneider et al.

(10) Patent No.: US 7,762,127 B2
(45) Date of Patent: Jul. 27, 2010

(54) METHOD FOR DETERMINING THE COMPOSITION OF A FUEL MIXTURE

(75) Inventors: Jens Schneider, Leonberg (DE); Heinz Fuchs, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 12/117,562

(22) Filed: May 8, 2008

(65) Prior Publication Data

US 2009/0024303 A1 Jan. 22, 2009

(30) Foreign Application Priority Data

Jun. 13, 2007 (DE) .................. 10 2007 027 181

(51) Int. Cl.
*G01N 33/22* (2006.01)

(52) U.S. Cl. .................. 73/114.73; 73/35.02; 73/35.03; 123/1 A; 123/672; 123/674; 123/406.3; 123/406.31; 701/109

(58) Field of Classification Search ..... 73/35.02–35.06, 73/114.71–114.73; 123/1 A, 406.3, 406.31, 123/672, 674; 701/109
See application file for complete search history.

(56) References Cited

U.S. PATENT DOCUMENTS

| | | | | |
|---|---|---|---|---|
| 4,905,649 A | | 3/1990 | Washino et al. | |
| 5,170,763 A | * | 12/1992 | Kitajima et al. | 123/491 |
| 5,255,661 A | * | 10/1993 | Nankee et al. | 123/674 |
| 5,400,762 A | * | 3/1995 | Fodale et al. | 123/674 |
| 5,515,280 A | * | 5/1996 | Suzuki | 701/29 |
| 6,257,174 B1 | * | 7/2001 | Huff et al. | 123/1 A |
| 6,298,838 B1 | * | 10/2001 | Huff et al. | 123/674 |
| 6,314,944 B1 | * | 11/2001 | Majima | 123/491 |
| 6,321,721 B1 | * | 11/2001 | Okumura et al. | 123/491 |
| 7,117,862 B2 | * | 10/2006 | May | 123/674 |
| 7,159,623 B1 | | 1/2007 | Carr et al. | |
| 2005/0039733 A1 | * | 2/2005 | DeWitte et al. | 123/672 |
| 2007/0163542 A1 | * | 7/2007 | Kettl et al. | 123/435 |

FOREIGN PATENT DOCUMENTS

DE 41 17 440 12/1991

* cited by examiner

*Primary Examiner*—Erick Solis
(74) *Attorney, Agent, or Firm*—Merchant & Gould P.C.

(57) ABSTRACT

The invention concerns a method for determining the composition of a fuel mixture from a first and at least a second fuel for operating a combustion engine, whereby the fuel mixtures of different compositions require various air/fuel ratios to achieve a stoichiometric combustion. Thereby it is provided that the air volume that has been delivered to the combustion engine, the fuel quantity that has been delivered and the oxygen content in the exhaust gas of the combustion engine are determined during one or several stationary operating phases of the combustion engine during one or several measuring phases, and in that the composition of the fuel mixture is determined from these values. The procedure allows an accurate and reliable determination of the composition of a fuel mixture for combustion engines that are operated in flex-fuel-mode.

14 Claims, 2 Drawing Sheets

METHOD FOR DETERMINING THE COMPOSITION OF A FUEL MIXTURE

TECHNICAL FIELD

The invention concerns a method for determining the composition of a fuel mixture from a first and at least a second fuel for operating a combustion engine, whereby fuel mixtures of different compositions require various air-fuel ratios in order to achieve a stoichiometric combustion.

BACKGROUND

Combustion engines on the basis of Otto Motors are usually operated with fuel consisting of hydrocarbons of fossil fuels based on refined petroleum. This fuel is increasingly admixed in different mixture rates with alcohol generating from renewable raw materials (plants), for example ethanol or methanol. In the US and Europe a mixture of 75-85% ethanol and 15-25% gasoline is applied under the trade name E85. The combustion engines are so construed that they can be operated with pure gasoline as well as with mixtures right up to E85; this is called "flex-fuel-operation". For an economical operation with a low emission of hazardous substances concurrently with a high engine performance the running parameters in the flex-fuel-operation have to be adjusted to the currently present fuel mixture. By way of example a stoichiometric air-fuel ratio is present at 14.7 parts of volume of air per part of volume of gasoline, but when using ethanol one air part of 9 parts of volume has to be adjusted.

The momentary fuel composition before the fuel injection timing and the momentary exhaust gas composition, the oxygen partial pressure in the exhaust gas, are determined by the interaction of sensors and then transferred to the control electronics of the combustion engine. On the basis of this sensor data the combustion of the combustion engine is optimized, especially by adjusting the advantageous air-fuel ratio.

A first sensor can be a fuel sensor, also called "fuel composition sensor". Fuel sensors use the various features of alcohol and gasoline for determining the fuel composition. Ethanol for example is a protic solvent, which contains hydrogen ions and a high dielectric constant that depends on the water content. Gasoline on the other hand is an aprotic solvent with a low dielectric constant. Based on this there are fuel sensors, which determine the fuel composition with the aid of the dielectric features of the fuel mixture. Other fuel sensors use various optic features of fuel, for example the different indices of refraction. Both sensor types are expensive and susceptible in its functioning.

The second sensor for example is a "downstream oxygen sensor", which determines the oxygen content in the exhaust gas behind a catalytic converter. Thereby it can be a stoichiometric or a wide-band lambda probe. Alternatively also a gas-selective exhaust gas probe, for example a nitric oxide probe, can be provided.

The fuel sensor determines the R—OH-parts in the fuel, whereby R describes hydrogen or different hydrocarbon-remains. On the basis of the sensor signals the control of the fuel pre-heating and of the temperature during the injection or the control of the injection- and ignition-moment as well as the compression of the fuel take place.

The lambda probe determines the oxygen partial pressure in the exhaust gas of the combustion engine, the regulating position of the combustion engine regarding a rich/lean setting as well as the regularization of the air-fuel ratio over the air volume and d the injection quantity.

Together the sensors take over the combustion regularization in the combustion engine. Thereby the information of the sensors is complementary. Since the oxygen supply of the fuel mixture or rather the air-fuel ratio and the regulating position during a preset fuel composition directly relate to each other, the system is partially over determined by the information that has been delivered by the sensors.

Due to DE 411 74 40 C2 a procedure is known for the adaptive setting of a fuel-air mixture for considering the fuel features during the operation of a combustion engine, which provides a lambda regulator that displays a regulating factor RF, and which provides an adaptation integrator, which displays an adaptation factor AF with a variable adaptation speed that influences the setting of the fuel-air mixture besides the regulating factor RF. Thereby it is provided that it is checked whether the lambda-regularization-deviance-amplitude exceeds a first threshold value, and, if this is the case, whether the adaptation speed is set at an increased level so long until a preset condition is achieved, after which a low adaptation speed is switched back on.

The procedure allows combustion engines, which can be operated with different fuels, to operate failure-free. Thus the injection time for example has to be extended by more than 20% during a change from a fuel gasoline to a fuel mixture of 85% ethanol and 15% gasoline, in order to achieve the same lambda values in the exhaust gas. According to the procedure described in the script DE 411 74 40 C2 a corresponding adaptation interference is undertaken therefore. In the suggested procedure the adaptation speed is significantly increased during a recognized fuel change, because a very intense correction of the injection times and therefore of the adaptation interference has to be undertaken during a fuel change, compared to the correction of aging influences or production influences.

On the basis of the set adaptation value the fuel mixture ratio can be determined. Despite the increased adaptation speed the procedure requires a sufficient long settling time. If a significant change of the fuel mixture ratio is caused by refueling, this can lead to startup problems and to combustion misses, which leads to increased exhaust gas emissions. Here the described fuel sensor can undertake a quick determination of the exhaust gas composition.

It is the inventions task to provide a procedure, which allows a reliable and economic detection of the composition of a fuel mixture consisting of at least two fuels, whereby fuel mixtures of different compositions require different air-fuel ratios to achieve a stoichiometric combustion.

SUMMARY

The invention's task is thereby solved, in that during one or multiple stationary operating phases of the combustion engine during one or multiple measuring phases the air volume that is delivered to the combustion engine, the delivered fuel volume and the oxygen content in the exhaust gas of the combustion engine are determined, and in that the composition of the fuel mixture is determined from these values. Modern combustion engines already register all factors for further control functions, corresponding sensors and correction algorithms are available. At a certain oxygen content in the exhaust gas of the combustion engine the delivered fuel volume and the delivered air volume are dependent on the mixture ratios of the fuels.

According to a preferred embodiment of the invention it is provided that an air-fuel ratio is determined by the air volume delivered to the combustion engine, by the delivered fuel volume and the oxygen content in the exhaust gas of the combustion engine and/or by a signal of a lambda probe that is arranged in the exhaust gas of the combustion engine, and that the composition of the fuel mixture is determined by this air-fuel ratio. The air-fuel ratio, depending on the oxygen content in the exhaust gas of the combustion engine, is typical for a present fuel mixture ratio. In the course of this the composition of the fuel mixture can be deduced from the air-fuel ratio. Thereby the application of the signal of a lambda probe is advantageous since lambda probes are used anyway in modern combustion engines and the signal of the lambda probe is available and by various correction methods correspondingly updated.

If it is provided that the stationary operating phase is set after a defined warming phase of the combustion engine and that the stationary operating phase is set during an idle phase and/or during a partial load phase of the combustion engine, sufficient stable conditions for an exact determination of the delivered air volume, the delivered fuel volume as well as the oxygen content in the exhaust gas of the combustion engine dominate. A lambda probe particularly requires a sufficient high operating temperature, which is achieved not until after a sufficient long operation of the combustion engine. By a specific regulating of the stationary operating phase the determination of the fuel composition can take place at operating points of the combustion engine, at which the required parameters can be determined very exactly.

To increase the exactness and the measurement-certainty it can be provided that different stationary operating statuses are adjusted by a variation of the air volume and/or the fuel volume and/or the regulating position of the lambda probe. Thereby the injection quantity can be modified by 10% to 25% during an operation at partial load at a controlled air volume for example in order to receive further landmarks.

As an alternative to the adjusted stationary operating phases for determining the composition of the fuel mixture it can be provided that the determination of the air volume and the fuel volume and the oxygen content in the exhaust gas of the combustion engine takes place continually or in fixed intervals and that the determination of the composition of the fuel mixture takes place when the combustion engine has been operated over a defined period of time under stationary operating conditions. This way no interferences in the operation of the combustion engine are necessary, which would for example affect the ride comfort during the use in a motor vehicle. It has to be generally provided that the measuring phase is kept as short as possible, preferably shorter than a second, to not affect the operation of the combustion engine.

If it is provided that the determination of the composition of the fuel mixture is carried out at a lambda value between 1.0 and 1.01, especially between 1.002 and 1.008, then the determination of the lambda value takes place in the area with the greatest accuracy of measurement of the lambda probe. Thereby the signal of the lambda probe is located in the range of ca. 430 mV to 470 mV.

A very accurate determination of the air volume that has been delivered to the combustion engine can be achieved thereby that the air volume that has been delivered to the combustion engine is assessed from the signals of an air-mass sensor, a temperature sensor and an external pressure sensor. Thereby the air volume cannot be chosen too little during the measuring phase due to accuracy reasons.

According to a preferred version of implementation of the invention it can be provided that in a first step the composition of the fuel mixture is determined with the aid of a fuel composition sensor, that in a second step the composition of the fuel mixture is assessed from the determined air-fuel ratio and that a abnormality between the ascertained values is determined. The fuel composition is thereby determined by two independent systems, which increases the accuracy of measurement.

If it is further provided that the abnormality is compared to a first threshold and that when the first threshold is exceeded a drift of the fuel composition sensor can be assumed and/or that the abnormality is compared to a second threshold and that when the second threshold is exceeded a malfunction of the fuel composition sensor can be assumed, then the performance of the fuel composition sensor can be corrected, while in the case of an identified malfunction or a failure of the fuel composition sensor an on-board-diagnose-display for example is activated.

A regular checking of the performance of the fuel composition sensor is thereby achieved, that the checking of the performance of the fuel composition sensor is automatically performed during the operation of the combustion engine in preset intervals or in intervals that are dependent on the operating parameters of the combustion engine. A defect of the fuel composition sensor is thereby recognized quickly and easily.

If a fuel mixture of more than two fuels is present, it can be advantageous that the percentage of one fuel of the fuel mixture is determined as the equivalent percentage of a second fuel. That way the calculation of the equivalent ethanol-percentage can be assessed from the total oxygen demand of the fuel mixture in a combustion engine, which is operated with gasoline, ethanol and methanol. The methanol-content is thereby converted in a corresponding ethanol-content.

The composition of the present fuel mixture can be passed on to the user of the combustion engine, for example the driver of a motor vehicle, by considering the determined composition of the fuel mixture at the calculation of the consumption data of the combustion engine. That way for example the ethanol-percentage of a gasoline-ethanol-mixture can be shown in a tank-fill-level-display or in an on-board-computer-display. Thereby an adequate accuracy of the display is achieved, when the percentage of a fuel of the fuel mixture is displayed in rounded percentages, for example 5%, 10% or 20%-increments.

The procedure can be used for the determination of a gasoline/ethanol-fuel mixture and/or a gasoline/methanol-fuel mixture and/or a gasoline/ethanol/methanol-fuel mixture and/or for the distinction of diesel and bio-diesel and/or for the detection of a false refueling.

The procedure can be further used for the adaptation of the operating parameters of the combustion engine to the present composition of the fuel mixture.

BRIEF DESCRIPTION OF THE DRAWINGS

The invention is annotated closer in the following by means of examples of embodiments that are shown in figures. It is shown in.

DETAILED DESCRIPTION

Figure 1:
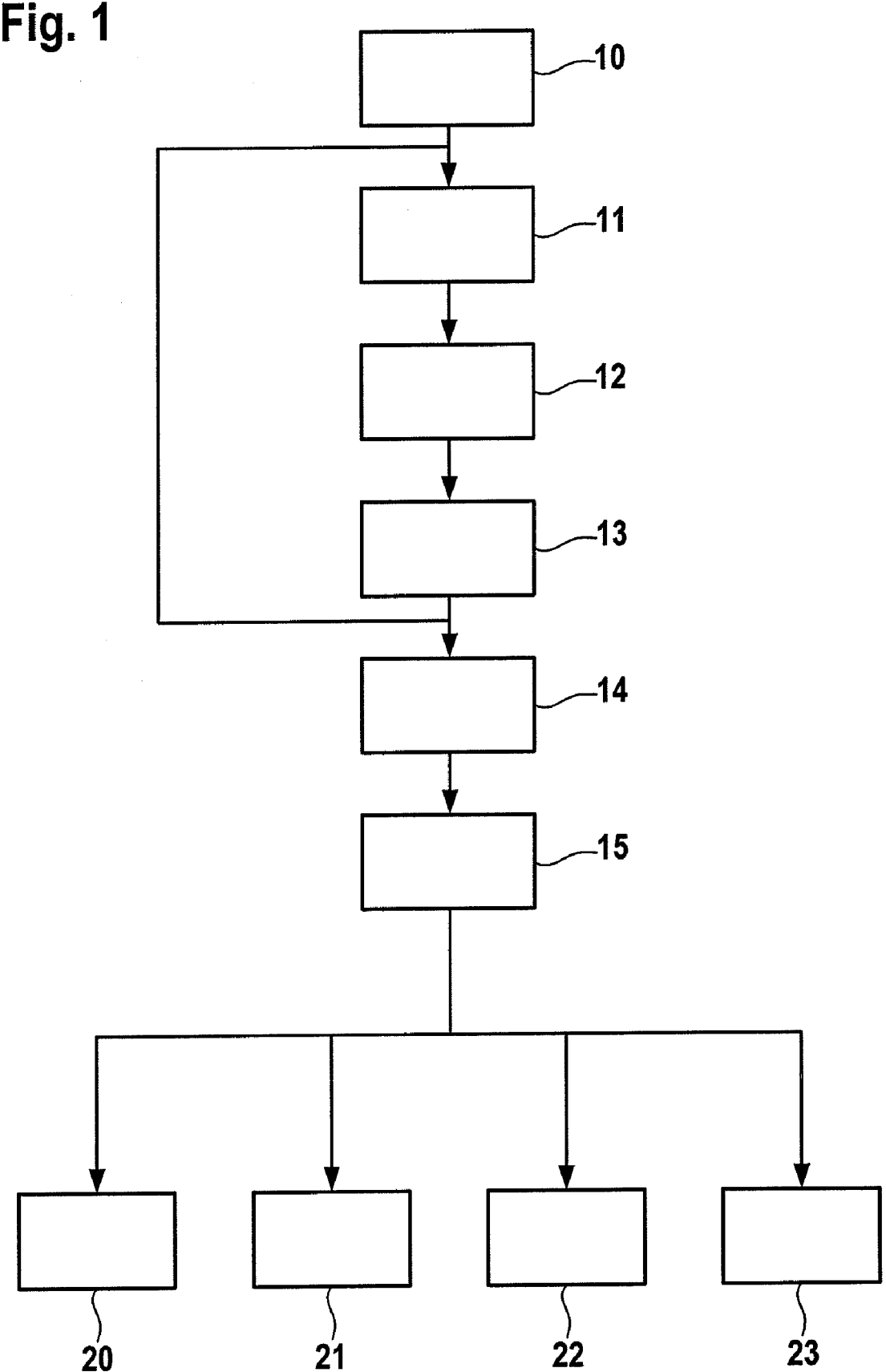
FIG. 1 a flow diagram for determining the composition of a fuel mixture of gasoline and ethanol, FIG. 2 a flow diagram for determining the composition of a fuel mixture of methanol-diesel and bio-diesel.

FIG. 1 shows a flow diagram for determining the composition of the fuel mixture of gasoline and ethanol.

The determination of the composition of the fuel mixture takes place in six consecutive phases, a 1st. phase B 10, a 2nd phase B 11, a 3rd phase B 12, a 4th phase B 13, a $5^{th}$ phase B 14 and a 6th phase B 15.

On the basis of the determined composition of the fuel mixture subsequently four possible implementations are provided, which are shown as a 1st interpretation B 20, a 2nd interpretation B 21, a 3rd interpretation B 22 and a 4th interpretation B23.

In the 1st phase B 10 the starting and the warming up of the combustion engine take place. A good start of the combustion engine has to be ensured under sufficient rich operating conditions. Hereby the recently saved operating parameters can be used. The determination of the composition of the fuel mixture can take place after a defined warming up phase For this purpose a stabile operating status of the combustion engine, for example idle, is set in the 2nd phase B 11. A calibrated stoichiometric downstream regulating probe (lambda-probe) regulates the combustion engine over the fuel quantity that has been delivered to the combustion engine on a probe signal of 430 mV to 470 mV, on a lambda-value between 1.002 and 1.008. In this area the lambda-probe shows the greatest measuring accuracy.

In the 3rd phase B 12 the air volume and the fuel volume that have been delivered to the combustion engine are determined at a set lambda-value during a preset measuring phase. The operation of the combustion engine shall be affected by the measurement as little as possible, therefore the measuring phase is as short as possible, preferably shorter than a second. The air volume and the fuel volume that have been delivered to the combustion engine are controlled constantly and accurately during the measuring phase. An accurate determination of the air volume is achieved by the interaction of an air-mass sensor, a temperature sensor and an external-pressure sensor. The air volume should be chosen sufficient big during the measuring phase in order to achieve a high measuring accuracy.

In the 4th phase B 13 the storage of a data record takes place, which consists of the values of the air volume, the fuel quantity and the lambda value.

Subsequent to the 4th phase B 13 the optional possibility exists to carry out further measurements in one or several operating statuses of the combustion engine, for example during an operation at partial load. Thereby the sequence jumps back into the 2nd phase B 11. Now the measurement can be carried out for example at an altered injection quantity and controlled air volume. This way several data sets can be produced during different operating statuses of the combustion engine and included in the subsequent interpretation, which increases the accuracy and the measuring safety. Thereby it is advantageous if also the following measurements are carried out at a signal of the lambda probe between 430 mV and 470 mV, so at a lambda between 1.002 and 1.008, in order to exploit the maximum measuring accuracy of the lambda probe.

In the 5th phase B 14 an air/fuel ratio is calculated from the obtained data sets in the engine electronics. At a fuel mixture consisting of gasoline and ethanol this value lies between 9.0 and 14.7.

The air/fuel ratio correlates with the composition of the fuel mixture. Therefore the determination of the composition of the fuel mixture can be ascertained in the 6th phase B 15 with the aid of air/fuel ratio that has been determined by several data sets. This value can lie between 0% and 100% ethanol percentage for a fuel mixture consisting of gasoline and ethanol, whereby a maximum ethanol percentage of 85% is common in Europe and the USA.

From the acquainted composition of the fuel mixture various implementations can be deduced. Thereby the implementation can also be provided optionally. It is provided in the 1st interpretation B 20 that the favorable operating parameters are set on the basis of the acquainted composition of the fuel mixture. This way the fuel injection quantity, the ignition timing or the fuel pre-warming can be adjusted to the present fuel mixture for example.

In the 2nd interpretation B 21 a checking of a fuel sensor, also know as fuel composition sensor, is provided. Fuel composition sensors are used in order to assess quick changes of the fuel composition, for example after a refuel, and to consider them at the setting of the operating parameters of the combustion engine. Thereby the fuel composition sensors use different features of the mixed fuel to determine the composition of the fuel mixture. There are optical fuel composition sensors, which use different indices of refraction of gasoline and alcohol. Furthermore there are fuel composition sensors, which exploit the different dielectric features of gasoline and alcohol. However, fuel composition sensors are expensive and susceptible in its performance. The described checking of the fuel composition sensor makes it possible to recognize and to balance a drift in the signal of the fuel composition sensor. A malfunction or a failure of the fuel composition sensor can also be recognized and for example indicated over an on-board-diagnose alarm (OBD-alarm).

According to the 3rd interpretation B 22 a display of the ascertained composition of the fuel mixture is provided for the user of the combustion engine, for example the driver of the motor vehicle. Thereby the ethanol-content of the fuel mixture is indicated in a display, for example a tank-fill-level display or an on-board computer display. Hereby it is especially advantageous to make the display of the ethanol-content in preset increments, for example in 5%, 1-0% or 20%-increments.

It is provided in the 4th interpretation B 23 that the composition of the fuel mixture is considered for the calculation and illustration of the operating statistic and of the consumption data of the combustion engine. Thereby the current fuel consumption, the mileage per volume of fuel, the achieved reach with the present tank filling or a statistic over the use of gasoline and alcohol can be ascertained by the total-operating-time of the combustion engine.

Figure 2:
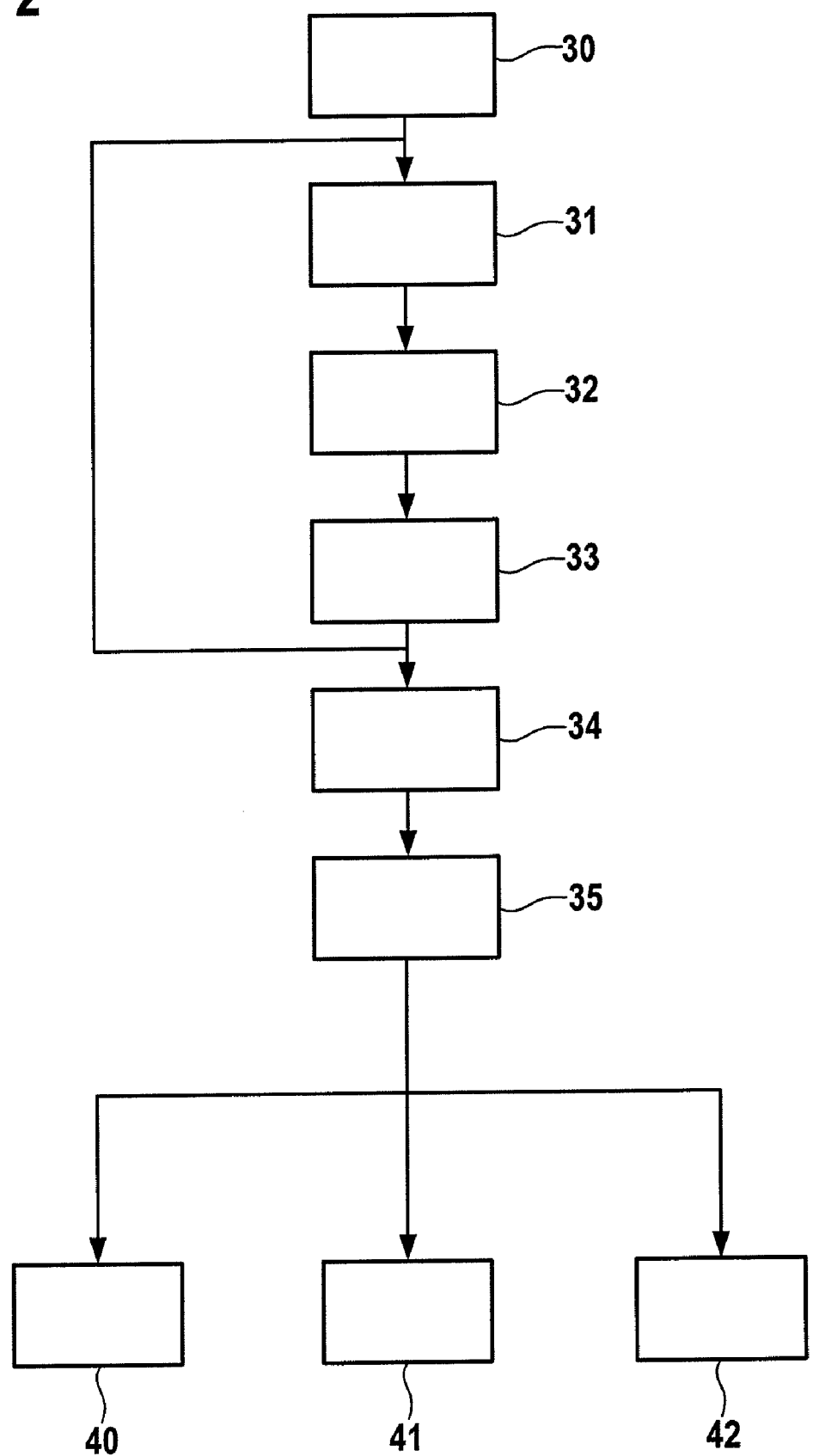

FIG. 2 shows a flow diagram for determining the composition of a fuel mixture consisting of mineral oil diesel and bio-diesel. Thereby the bio-diesel can be obtained for example from rape.

The determination of the composition of the fuel mixture takes place in six consecutive phases a 1st phase D 30, a 2nd phase D 31, a 3rd phase D 32, a 4th phase D 33, a 5th phase D 34 and a 6th phase D 35.

With the aid of the determined composition of the fuel mixture subsequently there are three possible implementations provided, which are shown as a 1st interpretation D 40, a 2nd interpretation D 41 and a 3rd interpretation D 42.

In the 1st phase D 30 the starting and the warming up of the combustion engine take place.

In the 2nd phase D 31 the setting of the lambda value in the exhaust gas of the combustion engine takes place to a preset value at stabile operating conditions with the aid of a leading broadband probe. Thereby lambda values of 1.1 according to a relatively rich air/fuel mixture or of 1.3 or of 1.7 according to lean air/fuel mixtures can be set.

In the 3rd phase D 32 during stabile operating conditions the air volume and the fuel volume that has been delivered to the combustion engine are ascertained. The implementation corresponds with the implementation described in FIG. 1.

A storing of the air- and fuel-volume that has been delivered to the combustion engine together with the adjusted lambda value takes place as a connected data record in the 4th phase D 33.

After the 4th phase D 33 there is the optional possibility to jump into the sequence before the $2^{nd}$ phase D 31 for the determination of further measurements. The difference in the oxygen demand between mineral oil diesel with an air/fuel ratio of 15.0 and rape-diesel with an air/fuel ratio of 13.8 is very minor, so that a very accurate determination of the air/fuel ratio is necessary to make a sufficient accurate statement about the composition of the fuel mixture. Therefore the determination of further data sets at different lambda values is useful to achieve a sufficient measuring accuracy.

In the following 5th phase D 34 the air/fuel ratio is determined from the obtained data sets.

Thereupon the composition of the fuel mixture is determined in the 6th phase D 35 from the air/fuel ratio.

Several implementations can be deduced from the composition of the fuel mixture that is now known. Thereby the implementations can be provided optionally.

According to a 1st interpretation D 40 favorable combustion parameters for the combustion engine per engine map can be obtained accordingly to the ascertained composition of the fuel mixture.

The 2nd interpretation D 41 provides for an indication of the fuel composition in terms of a display, for example within a tank-fill-level-display or in the display of an on-board computer. Thereby also here a corresponding incrementing of the display in 5%, 10% or 20%-steps can be provided.

According to the 3rd interpretation D 42 the known composition of the fuel mixture can be used for the calculation and illustration of the operating statistic and the consumption data of the combustion engine. Thereby the current fuel consumption, the mileage per volume of fuel, the achievable reach with the present tank filling or a statistic about the use of mineral oil diesel and bio-diesel over the total operating time can be ascertained.

The invention claimed is:

1. A method of determining the composition of a fuel mixture from a first and at least a second fuel for the operation of a combustion engine, whereby fuel mixtures of different compositions require a fuel mixture specific air/fuel ratio in order to achieve a stoichiometric combustion, the method comprising:
   determining an oxygen content value of an exhaust gas during one or more measuring phases of one or more stationary operating phases;
   determining an air volume value delivered to the combustion engine during the one or more measuring phases;
   determining a fuel volume value delivered to the combustion engine during the one or more measuring phases; and
   determining a fuel mixture composition from the oxygen content value, the air volume value, and the fuel volume value.

2. A method according to claim 1, wherein the air/fuel ratio is determined from the air volume value, the fuel volume value, and the oxygen content value or a signal of a lambda probe that is arranged in the exhaust gas of the combustion engine.

3. A method according to claim 1, further comprising setting the one or more stationary operating phases after a defined warming up period of the combustion engine, during an idle phase, or during an operation at partial load of the combustion engine.

4. A method according to claim 1, further comprising setting the one or more stationary operating phases by a variation of the air volume value, of a fuel quantity value, or of a regulating position of a lambda probe.

5. A method according to claim 1, wherein determining the air volume value, a fuel quantity value and the oxygen content value takes place continuously or in specified intervals, and in that determining the fuel mixture composition takes place when the combustion engine has been operated over a defined period of time under stationary operating conditions.

6. A method according to claim 1, wherein determining of the fuel mixture composition is carried out at a lambda value between 1.0 and 1.01, especially between 1.002 and 1.008.

7. A method according to claim 1, wherein determining the air volume value from an air mass sensor signal, a temperature sensor signal, and an external pressure sensor signal.

8. A method according to claim 1, wherein determining the fuel mixture composition is with the aid of a fuel composition sensor in a first step, in that the fuel mixture composition is determined from the air/fuel ratio in a second step, and in that a discrepancy between an ascertained fuel composition value and a fuel mixture value is determined.

9. A method according to claim 8, wherein the discrepancy is compared with a first threshold and that in the case of exceeding the first threshold a drift of a fuel composition sensor is assumed, or in that the discrepancy is compared to a second threshold and that in the case of exceeding the second threshold a malfunction of the fuel composition sensor is assumed.

10. A method according to claim 9, further comprising checking of the functioning of a fuel composition sensor, wherein the checking is carried out in one or more preset intervals during the operation of the combustion engine or automatically in one or more intervals that are dependent on one or more operating parameters of the combustion engine.

11. A method according to claim 1, further comprising determining a part of a first fuel of the fuel mixture composition at an equivalent part of a second fuel.

12. A method according to claim 1, wherein a determined fuel mixture composition is shown in a display or considered during a calculation of a consumption data of the combustion engine.

13. Use of a combustion engine to determine a composition of a gasoline/ethanol-fuel mixture, a gasoline/methanol fuel mixture, a gasoline/ethanol/methanol fuel mixture, for the differentiation of a diesel fuel and a biodiesel fuel, or for the detection of a combustion engine malfunction by implementation of a method of determining the composition of a fuel mixture from a first and at least a second fuel for the operation of a combustion engine, whereby fuel mixtures of different compositions require various air-fuel ratios in order to achieve a stoichiometric combustion, the method comprising:
   determining an oxygen content value of an exhaust gas during one or more measuring phases of one or more stationary operating phases; determining an air volume value delivered to the combustion engine during the one or more measuring phases; determining a fuel volume value delivered to the combustion engine during the one or more measuring phases; and
   determining a fuel mixture composition from the oxygen content value, the air volume value, and the fuel volume value.

14. Use of a combustion engine to facilitate the adaptation of one or more combustion engine operating parameters to a present composition of a fuel mixture by implementation of a method of determining the composition of a fuel mixture from a first and at least a second fuel for the operation of a combustion engine, whereby fuel mixtures of different compositions require various air-fuel ratios in order to achieve a stoichiometric combustion, the method comprising: providing one or more stationary operating phases of the combustion engine; providing one or more measuring phases of the combustion engine occurring during the one or more stationary operating phases; determining an oxygen content value of an exhaust gas during the one or more measuring phases; determining an air volume value delivered to the combustion engine during the one or more measuring phases; determining a fuel volume value delivered to the combustion engine during the one or more measuring phases; and determining a fuel mixture composition from the oxygen content value and the air volume value and the fuel volume value.

* * * * *